(12) United States Patent
Nashio

(10) Patent No.: US 11,321,509 B2
(45) Date of Patent: May 3, 2022

(54) METHOD AND DEVICE FOR ANALYZING FLUID AROUND ROTATING BODY

(71) Applicant: TOYO TIRE CORPORATION, Itami (JP)

(72) Inventor: Hiroshi Nashio, Itami (JP)

(73) Assignee: TOYO TIRE CORPORATION, Itami (JP)

(*) Notice: Subject to any disclaimer, the term of this patent is extended or adjusted under 35 U.S.C. 154(b) by 153 days.

(21) Appl. No.: 16/623,125

(22) PCT Filed: May 21, 2018

(86) PCT No.: PCT/JP2018/019522
§ 371 (c)(1),
(2) Date: Dec. 16, 2019

(87) PCT Pub. No.: WO2018/235490
PCT Pub. Date: Dec. 27, 2018

(65) Prior Publication Data
US 2020/0218840 A1 Jul. 9, 2020

(30) Foreign Application Priority Data
Jun. 19, 2017 (JP) .............................. JP2017-119646

(51) Int. Cl.
*G06F 30/28* (2020.01)
*G06F 113/08* (2020.01)
*G06F 111/10* (2020.01)

(52) U.S. Cl.
CPC .......... *G06F 30/28* (2020.01); *G06F 2111/10* (2020.01); *G06F 2113/08* (2020.01)

(58) Field of Classification Search
CPC .. G06F 30/28; G06F 2113/08; G06F 2111/10; G06F 30/20; G01M 9/08; G01M 9/067; G01M 17/027; B60C 19/00
See application file for complete search history.

(56) References Cited

U.S. PATENT DOCUMENTS

| | | | |
|---|---|---|---|
| 6,430,993 B1* | 8/2002 | Seta | B60C 11/00 73/146 |
| 7,149,670 B2* | 12/2006 | Iwasaki | G06F 30/23 703/8 |

(Continued)

FOREIGN PATENT DOCUMENTS

| JP | 2012-6522 A | 1/2012 |
| JP | 2013-037434 A | 2/2013 |

(Continued)

OTHER PUBLICATIONS

Teddy Hobeika, et al., "Study of different tyre simulation methods and effects on passenger car aerodynamics," DOI: 10.1533/9780081002452.5.187, In book: The International Vehicle Aerodynamics Conference. (2014) (Year: 2014).*

(Continued)

*Primary Examiner* — Steven W Crabb
(74) *Attorney, Agent, or Firm* — WHDA, LLP

(57) ABSTRACT

A method for analyzing fluid around a rotating body includes: a step (S100) in which a spatial model having a rotating computational mesh cell group A and a stationary computational mesh cell group B is acquired; a step (S101) in which a storage computational mesh cell group C is established; a step (S102) in which arithmetic operations for fluid analysis are performed; a step (S103) in which the physical quantity at the computational mesh cell making up the rotating computational mesh cell group A calculated as a result of arithmetic operations for fluid analysis is copied to a corresponding computational mesh cell at the storage computational mesh cell group C; and a step (S104) in which averages over time are calculated for the physical quantities at the storage computational mesh cell group C and the stationary computational mesh cell group B.

12 Claims, 8 Drawing Sheets

(56) References Cited

U.S. PATENT DOCUMENTS

2003/0040894 A1     2/2003  Miyori et al.
2012/0296616 A1*   11/2012  Tsunoda .................. G06G 7/57
                                                         703/9
2013/0275104 A1    10/2013  Imamura

FOREIGN PATENT DOCUMENTS

| JP | 2013-88871 A  | 5/2013  |
| JP | 2013-216269 A | 10/2013 |
| JP | 2015-114151 A | 6/2015  |

OTHER PUBLICATIONS

Extended Search Report dated Jul. 13, 2020, issued in counterpart EP Application No. 18821484.5 (9 pages).
International Search Report dated Aug. 7, 2018, issued in counterpart International Application No. PCT/JP2018/019522 (1 page).
Notification of Transmittal of Translation of the International Preliminary Report on Patentability (Form PCT/IB/338) issued in counterpart International Application No. PCT/JP2018/019522 dated Jan. 2, 2020, with Forms PCT/IB/373 and PCT/ISA/237. (8 pages).
Office Action dated Dec. 2, 2020, issued in counterpart JP Application No. 2017-119646, with English Translation. (6 pages).

\* cited by examiner

METHOD AND DEVICE FOR ANALYZING FLUID AROUND ROTATING BODY

TECHNICAL FIELD

The present invention relates to a method and device for analyzing fluid around a rotating body.

BACKGROUND ART

In recent years, simulations for analyzing fluid around rotating bodies have been proposed for the purpose of evaluating such aspects of performance as water shedding performance and performance with respect to noise such as may be caused by fluid (air, water, etc.) around tires and other such rotating bodies. As such simulation method, a computerized model is employed to simulate the rotation of a rotating body, at which time a physical quantity pertaining to the fluid around the rotating body being modeled is calculated, the physical quantity pertaining to the fluid being used to evaluate aspects of performance such as performance with respect to water shedding and noise. As related art, Patent References Nos. 1 and 2 have been disclosed.

PRIOR ART REFERENCES

Patent References

Patent Reference No. 1: Japanese Patent Application Publication Kokai No. 2013-216269
Patent Reference No. 2: Japanese Patent Application Publication Kokai No. 2012-6522

SUMMARY OF INVENTION

Problem to be Solved by Invention

In the context of a fluid analytic model used in a simulation, fluid space(s) at which fluid is present are represented by a plurality of computational mesh cells, physical quantity or quantities (speed and/or the like) pertaining to the fluid being calculated for each of the computational mesh cells. The fluid space(s) must take into account the shape of the exterior surface of the rotating body. The reason for this is that, taking the case in which the rotating body is a tire and in which a groove that intersects the tire circumferential direction is present at the exterior surface of the tire, because the location of the groove will change with each passage of time, the shape(s) of the fluid space(s) will change.

Where shape(s) of fluid space(s) thus change with passage of time, a model is generated in which the space between the rotating body and an imaginary boundary that covers the rotating body is represented by rotating computational mesh cells, and the space to the exterior of the imaginary boundary is represented by stationary computational mesh cells. In addition, one thing that might be attempted is to perform arithmetic operations for fluid analysis in which arithmetic operations are carried out with respect to a physical quantity pertaining to the fluid for each of the computational mesh cells as the rotating computational mesh cells are made to rotate about the rotational axis while the locations of the stationary computational mesh cells are held in place.

Using such a method, as shown in FIG. 6, it is possible to calculate a physical quantity pertaining to the fluid for a given (instant in) time. As shown in FIG. 7, for space(s) where stationary computational mesh cells are present, it is possible to calculate an average over time of a physical quantity pertaining to a fluid for a prescribed interval of time that includes a plurality of points in time. However, for space(s) where rotating computational mesh cells are present, because the locations of the computational mesh cells themselves change, proper calculation of average values is not possible. At FIG. 6 and FIG. 7, fluid speed is indicated by color. As shown in FIG. 7, for space(s) where rotating computational mesh cells are present, even if one succeeds in correctly averaging the values of the moving computational mesh cells, it will still not be possible to obtain a proper spatial distribution of the physical quantity.

Note that while the foregoing explanation was given in terms of the situation in which the rotating body is a tire, to the extent that fluid analysis is performed using a method in which the rotating body is such that the surrounding fluid domains change due to rotation or in which locations are made to change as a result of rotation without causing a change in the shapes of the rotating computational mesh cells, a similar problem will also exist for rotating bodies other than tires.

The present invention was conceived in view of such problems, it being an object thereof to provide a method and device for analyzing fluid around a rotating body that will make it possible to calculate an average over time of a physical quantity pertaining to a fluid.

Means for Solving Problem

To achieve the foregoing object, the present invention employs means as described below.

In other words, according to the present invention, there is provided a method for analyzing a fluid around a rotating body, comprising:

a step in which a spatial model having a rotating computational mesh cell group which represents a space between the rotating body and an imaginary boundary that covers the rotating body, and a stationary computational mesh cell group which represents a space to an exterior of the imaginary boundary, is acquired;

a step in which a storage computational mesh cell group is established in the space between the rotating body and the imaginary boundary;

a step in which arithmetic operations for fluid analysis are performed in which the arithmetic operations are carried out with respect to a physical quantity pertaining to the fluid for each computational mesh cell as a location of the stationary computational mesh cell group is held in place and the rotating computational mesh cell group is made to rotate about a rotational axis;

a step in which the physical quantity at the computational mesh cell making up the rotating computational mesh cell group calculated as a result of the arithmetic operations for fluid analysis is copied to a corresponding computational mesh cell at the storage computational mesh cell group; and a step in which averages over time are calculated for the physical quantities at the storage computational mesh cell group and the stationary computational mesh cell group.

By so doing, it will be possible to cause the physical quantity at rotating computational mesh cell group for a given time to be stored at storage computational mesh cell group, and for the set of physical quantities as they exist in space to be retained, as a result of which it will be possible to calculate the set of averages over time as they exist in space and to know the spatial distribution of the physical quantity.

EMBODIMENTS FOR CARRYING OUT INVENTION

Below, an embodiment of the present invention is described with reference to the drawings.

Device for Analyzing Fluid Around Rotating Body

Figure 1:
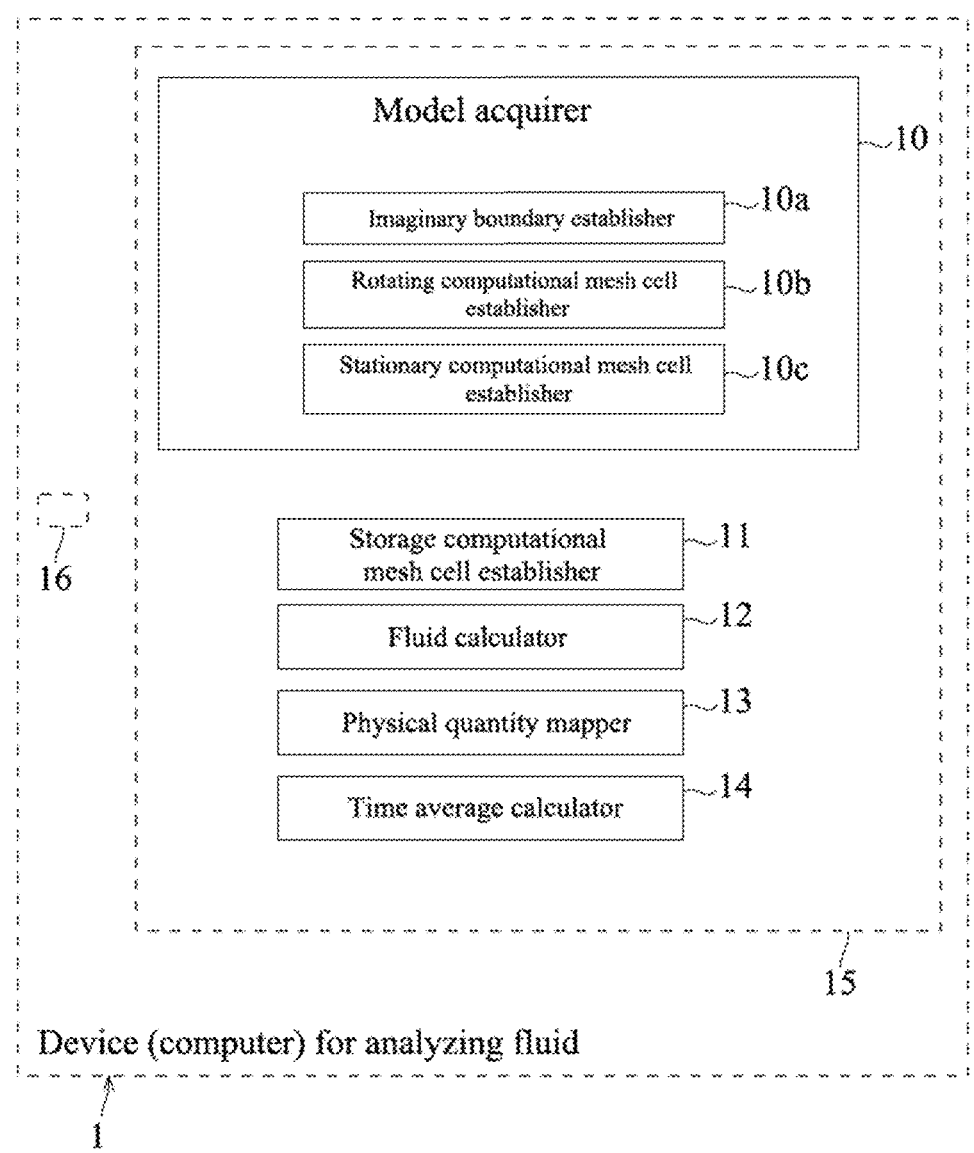
FIG. 1 Block diagram showing a device for analyzing fluid around a rotating body in accordance with the present invention.

Fluid analysis device 1 in accordance with the present embodiment is a device that simulates the behavior of fluid around a rotating body. While the present embodiment will be described in terms of a situation in which the rotating body is a tire, it is not limited to tires. As shown in FIG. 1, fluid analysis device 1 has model acquirer 10, storage computational mesh cell establisher 11, fluid calculator 12, physical quantity mapper 13, and time average calculator 14. These respective units 10 through 14 are implemented in cooperative fashion in software and hardware as a result of execution of the processing routine at FIG. 5 which has been previously stored by processor(s) 15 at personal computer(s) and/or other such information processing apparatus(es) equipped with CPU(s) and/or other such processor(s) 15, memory or memories 16, various interface(s), and so forth.

Figure 2:
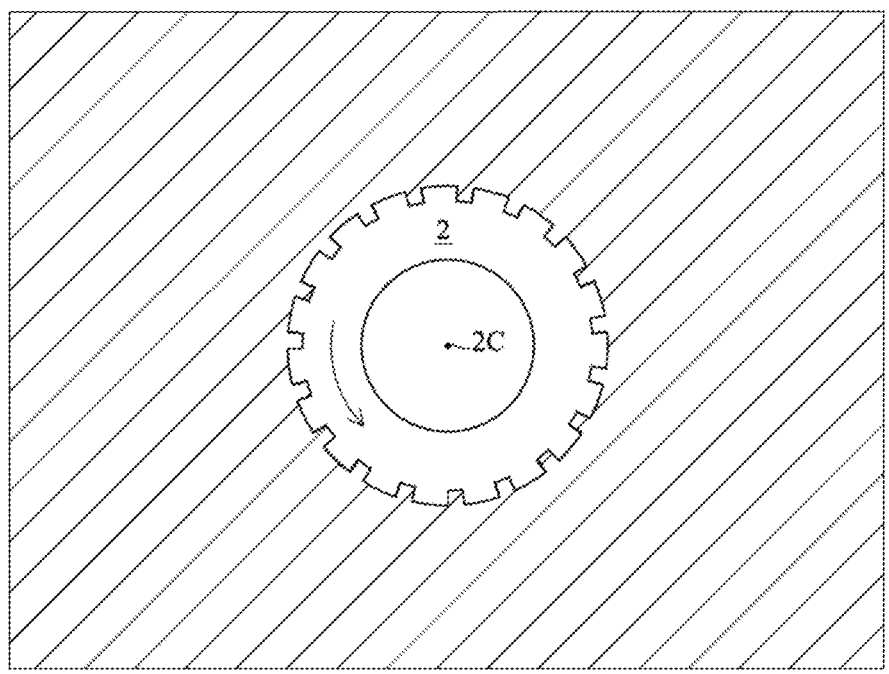
FIG. 2 Sectional view which is perpendicular to the rotational axis of a rotating body and which shows the space around the rotating body.

FIG. 2 shows the space around rotating body 2, being a cross-section perpendicular to rotational axis 2C of rotating body 2. As shown in FIG. 2, description will be given in terms of an example in which rotating body 2 rotates about rotational axis 2C, and a physical quantity pertaining to the fluid in the space (indicated by hatching in the drawing) around the rotating body is calculated.

Figure 3:
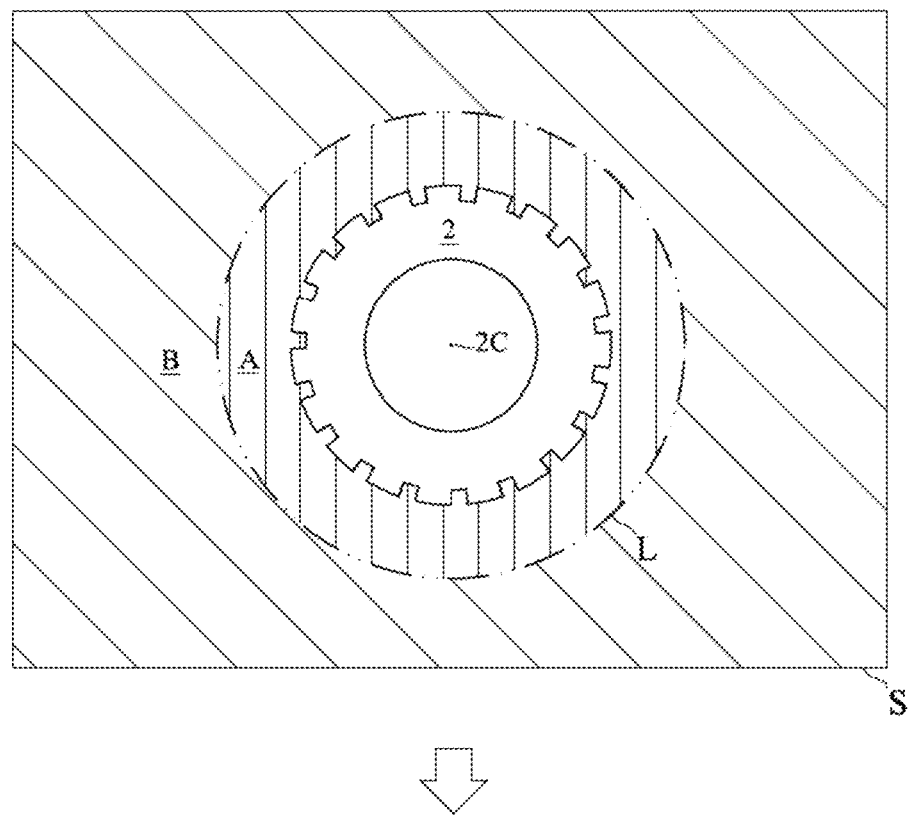
FIG. 3 Drawing showing spatial model having a group of rotating computational mesh cells and a group of stationary computational mesh cells, and showing the situation that exists when the group of rotating computational mesh cells rotate in clockwise fashion.
Figure 3:
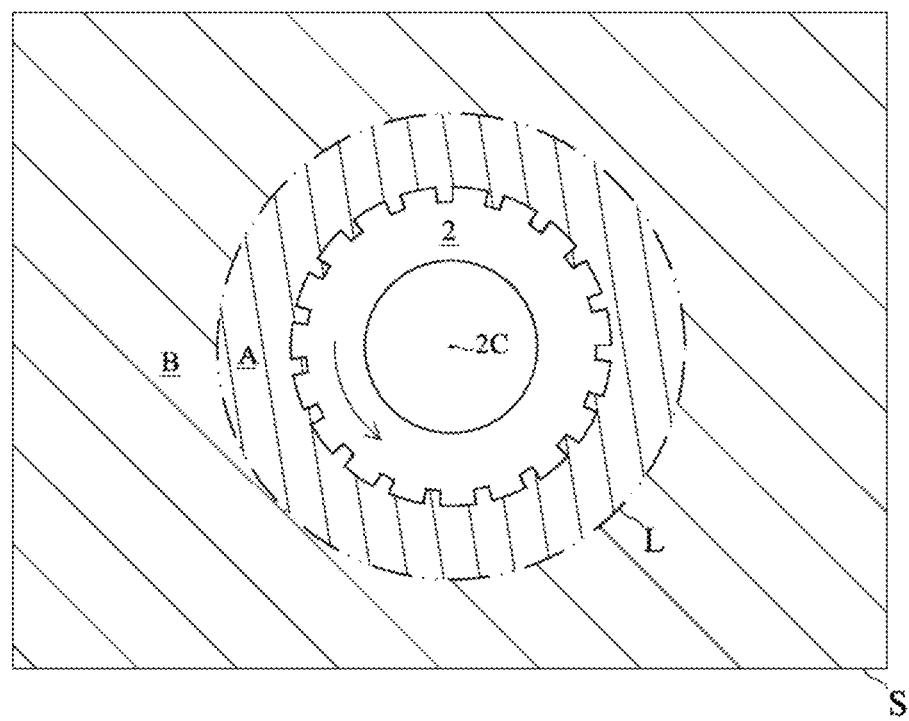

Model acquirer 10 shown in FIG. 1 acquires a spatial model having rotating computational mesh cell group A and stationary computational mesh cell group B as shown in FIG. 3.

Rotating computational mesh cell group A, which is a plurality of computational mesh cells that represent the space between rotating body 2 and imaginary boundary L which covers rotating body 2, rotates about rotational axis 2C when fluid arithmetic operations are carried out. FIG. 3 shows the situation that exists when rotating computational mesh cell group A rotates in clockwise fashion. Rotating computational mesh cell group A represents the space between imaginary boundary L and the exterior surface of the tire including the tire grooves. The location in space of stationary computational mesh cell group B, which is a plurality of computational mesh cells that represent the space to the exterior of imaginary boundary L, is held in place. Although a plurality of finely divided computational mesh cells are in reality arranged in those spaces, they have been omitted from the drawing for convenience of description.

Whereas imaginary boundary L of the present embodiment is in the shape of a cylinder, the axis of which is rotational axis 2C of rotating body 2, so long as it will allow imaginary boundary L to serve as boundary such that a physical quantity is capable of entering thereinto and exiting therefrom, it is not limited to being of cylindrical shape. Spheres, combinations of plane surface(s) and cylinder(s), polygonal pyramids, and so forth in which rotational axis 2C of rotating body 2 serves as axis may be cited as examples. But where imaginary boundary L is a shape other than a simple cylinder or a perfect sphere, so as to make it possible for the physical quantity to enter thereinto and exit therefrom by way of imaginary boundary L, it will be necessary as calculation progresses to not only cause rotation about the rotational axis but to also cause deformation of mesh cells in the vicinity of imaginary boundary L. In such case, arithmetic operations are performed for fluid analysis in which arithmetic operations are carried out with respect to the physical quantity pertaining to the fluid for each of the computational mesh cells as rotating computational mesh cell group A is made to deform and is made to rotate about rotational axis 2C. On the other hand, where imaginary boundary L is a simple cylinder or a perfect sphere, because it will not be necessary to cause deformation of mesh cells in the vicinity of imaginary boundary L, rotating computational mesh cell group A need only be made to rotate about rotational axis 2C during fluid calculations. Of course, upon consideration not only of deformation of mesh cells in the vicinity of imaginary boundary L but also, for example, deformation due to contact with the road surface, deformation as a result of being acted on by forces from the surrounding fluid, and so forth, it will be the case that rotating computational mesh cell group A will be made to deform and to rotate about rotational axis 2C.

Whereas model acquirer 10 of the present embodiment generates the spatial model shown in FIG. 3 based on data pertaining to the exterior surface of the tire, there is no limitation with respect thereto. For example, model acquirer 10 may be constituted so as to acquire, from internal memory 16 or storage on an external network, spatial model data that has already been generated. Model acquirer 10 of the present embodiment has imaginary boundary establisher 10a, rotating computational mesh cell establisher 10b, and stationary computational mesh cell establisher 10c. As shown in FIG. 3, imaginary boundary establisher 10a establishes imaginary boundary L that covers rotating body 2. Rotating computational mesh cell establisher 10b divides the space between rotating body 2 and imaginary boundary L established by imaginary boundary establisher 10a into a plurality of spaces to establish rotating computational mesh cell group A. Stationary computational mesh cell establisher 10c divides the space between the preestablished outermost surface S of the analytic target space that is required for analysis and imaginary boundary L that has been established by imaginary boundary establisher 10a into a plurality of spaces to establish stationary computational mesh cell group B.

Figure 4:
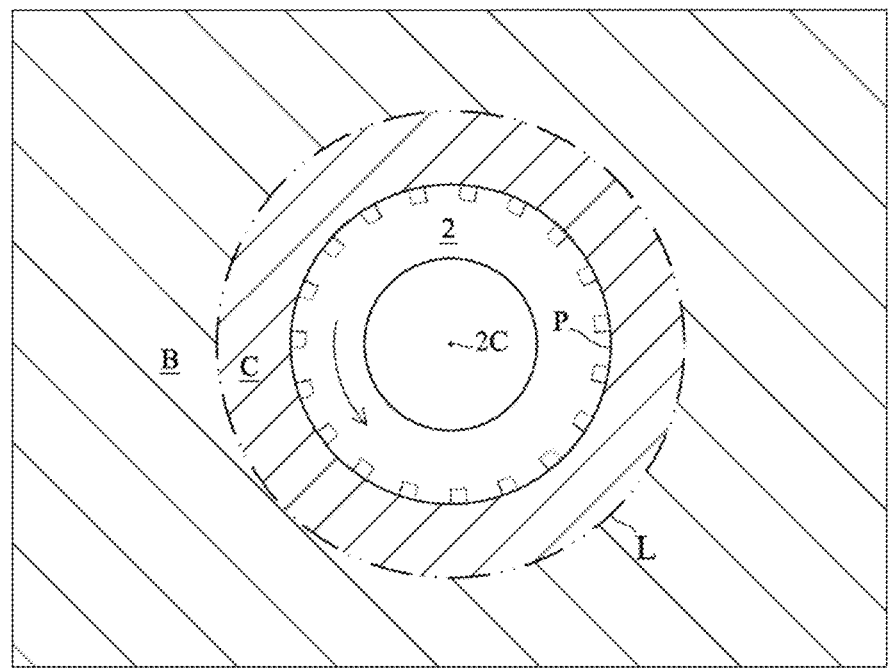
FIG. 4 Drawing to assist in description related to a storage computational mesh cell group.

Storage computational mesh cell establisher 11 shown in FIG. 1 establishes storage computational mesh cell group C in the space between imaginary boundary L and rotating body 2 as shown in FIG. 4. In accordance with the present embodiment, the space from locus P of rotation of that portion of rotating body 2 which is farthest from rotational axis 2C to imaginary boundary L is divided into a plurality of spaces to establish storage computational mesh cell group C. While it is often the case that tire diameter is constant, and it is often the case that the locus P of rotation of that portion of rotating body 2 which is farthest from rotational axis 2C is a circle of prescribed diameter having rotational axis 2C as center, there is no limitation with respect thereto. The reason that the region to the interior of the locus P of rotation of that portion of rotating body 2 which is farthest from rotational axis 2C is excluded is that the average over time of the physical quantity at said interior region is insignificant. Whereas storage computational mesh cell group C in accordance with the present embodiment is such that computational mesh cells are not established in the region to the interior of the locus P of rotation of that portion of rotating body 2 which is farthest from rotational axis 2C, there is no limitation with respect thereto. Despite the fact that they are insignificant, computational mesh cells may be established in said interior region.

As the size of the computational mesh cells that make up rotating computational mesh cell group A and stationary computational mesh cell group B is related to the precision within which fluid analysis is carried out, these should be established such that the sizes thereof correspond to the desired precision. On the other hand, because storage computational mesh cell group C is used to see the spatial distribution of the average over time of the physical quantity, the size of the computational mesh cells that make up storage computational mesh cell group C may be greater than the size of the computational mesh cells that make up stationary computational mesh cell group B.

Where this is done, so long as it is possible to view the spatial distribution of the physical quantity, because there is no need for the cells to be finely divided such as is the case with the rotating computational mesh cells, this will make it possible to achieve reduction in computational cost. Storage computational mesh cell group C and stationary computational mesh cell group B may of course be made up of computational mesh cells of the same size. While there is little benefit to be had from doing so, the computational mesh cells that make up storage computational mesh cell group C may be made smaller than the computational mesh cells that make up stationary computational mesh cell group B.

Fluid calculator 12 shown in FIG. 1 performs arithmetic operations for fluid analysis in which arithmetic operations are carried out with respect to the physical quantity pertaining to the fluid for each of the computational mesh cells as the location(s) of stationary computational mesh cell group B are held in place and rotating computational mesh cell group A is made to rotate about rotational axis 2C. The physical properties, physical model, and other such calculation conditions necessary for calculating the behavior of the fluid are established at rotating computational mesh cell group A and stationary computational mesh cell group B. Arithmetic operations for fluid analysis being known, detailed description thereof will be omitted: the physical quantity is calculated for all computational mesh cells at a given time, and the physical quantity is calculated for all computational mesh cells at a subsequent time following passage of unit time from the given time, calculation of the physical quantity being performed in repeated fashion from the analysis start time until the target time is reached.

Physical quantity mapper 13 shown in FIG. 1 carries out mapping processing in which the physical quantities at computational mesh cells making up rotating computational mesh cell group A calculated by fluid calculator 12 are copied to the corresponding computational mesh cells at storage computational mesh cell group C. This will make it possible to cause the physical quantity at rotating computational mesh cell group A for a given time to be stored at storage computational mesh cell group C, as a result of which it will be possible for the set of physical quantities as they exist in space to be retained. It is sufficient that the mapping processing be such as to cause these to be associated therewith in correspondence to the locations in space. Where rotating computational mesh cell group A and storage computational mesh cell group C are mutually completely identical, the physical quantities at computational mesh cells having mutually identical locations may be copied as is. Where rotating computational mesh cell group A and storage computational mesh cell group C are not mutually identical, the correspondence therebetween may be determined based on the degree to which they overlap in space, and the physical quantities may be copied in apportioned fashion.

Time average calculator 14 shown in FIG. 1 calculates at prescribed timing the average over time of the physical quantities at storage computational mesh cell group C and stationary computational mesh cell group B. In accordance with the present embodiment, upon passage of each unit time, time average calculator 14 calculates the average over time of the physical quantities at storage computational mesh cell group C and stationary computational mesh cell group B. By so doing, because time average arithmetic operations are carried out with passage of each unit time, it is possible to reduce the storage capacity that is required. Of course, there is no limitation with respect thereto. For example, while it will cause the storage capacity that is required to increase, physical quantities for all times from the analysis start time to the analysis end time may be stored at storage computational mesh cell group C, and the average over time of the physical quantities may be calculated following completion of the arithmetic operations for fluid analysis.

Figure 5:
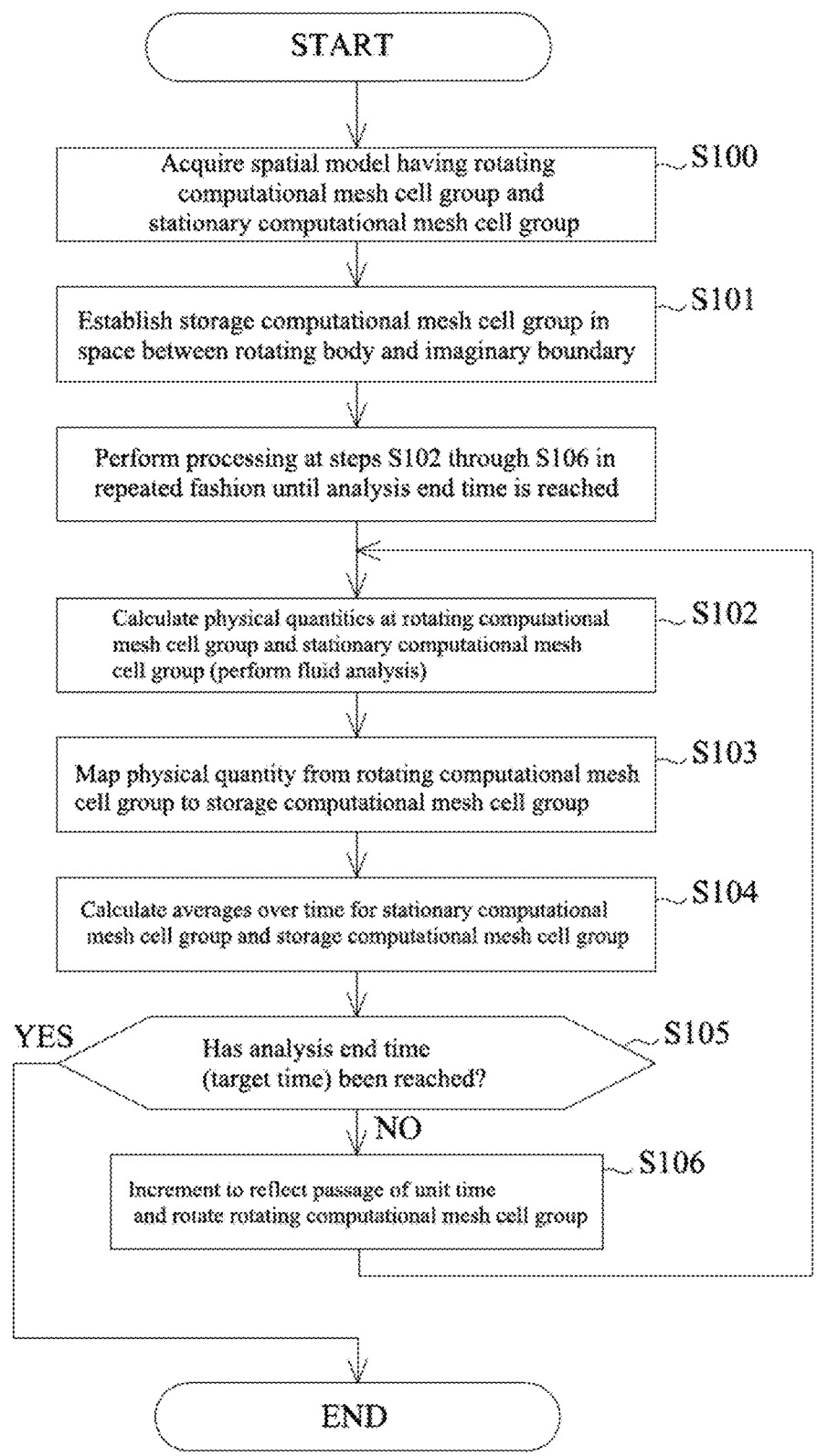
FIG. 5 Flowchart showing method for analyzing fluid.

Method for Analyzing Fluid A method for using the foregoing device 1 to analyze the fluid around a rotating body will now be described using FIG. 5.

First, at step S100, model acquirer 10 acquires a spatial model having rotating computational mesh cell group A which represents the space between rotating body 2 and imaginary boundary L that covers rotating body 2, and stationary computational mesh cell group B which represents the space to the exterior of imaginary boundary L.

Next, at step S101, storage computational mesh cell establisher 11 establishes storage computational mesh cell group C in the space between imaginary boundary L and rotating body 2.

Next, the processing at steps S102 through S106 is performed in repeated fashion until the analysis end time (target time) is reached (S105: YES).

At step S102, fluid calculator 12 performs arithmetic operations for fluid analysis in which arithmetic operations are carried out with respect to the physical quantity pertaining to the fluid for each of the computational mesh cells as the location(s) of stationary computational mesh cell group B are held in place and rotating computational mesh cell group A is made to rotate about rotational axis 2C.

Next, at step S103, physical quantity mapper 13 causes the physical quantities at computational mesh cells making up rotating computational mesh cell group A calculated as a result of arithmetic operations for fluid analysis carried out by fluid calculator 12 to be copied to the corresponding computational mesh cells at storage computational mesh cell group C.

Next, at step S104, time average calculator 14 calculates the average over time of the physical quantities at storage computational mesh cell group C and stationary computational mesh cell group B. Here, the average over time that was calculated during the previous time may be multiplied by the number of times that averaging has been carried out so far, following which that is then added to the physical quantity calculated during the current time, following which that is then divided by the foregoing number of times that averaging has been carried out so far plus 1 for the current time, to calculate the average over time.

Next, at step S105, evaluation is carried out to determine whether the analysis end time (target time) has been reached, processing being terminated if it is determined that the analysis end time has been reached. If it is determined that the analysis end time (target time) has not been reached, then at the next step, which is step S106, unit time is made to pass from the present time so as to jump to the next time, rotating computational mesh cell group A is made to rotate so as to assume the configuration of the spatial model for the next time, and processing returns to step S102.

Benefits of the present invention will now be described.

Figure 6:
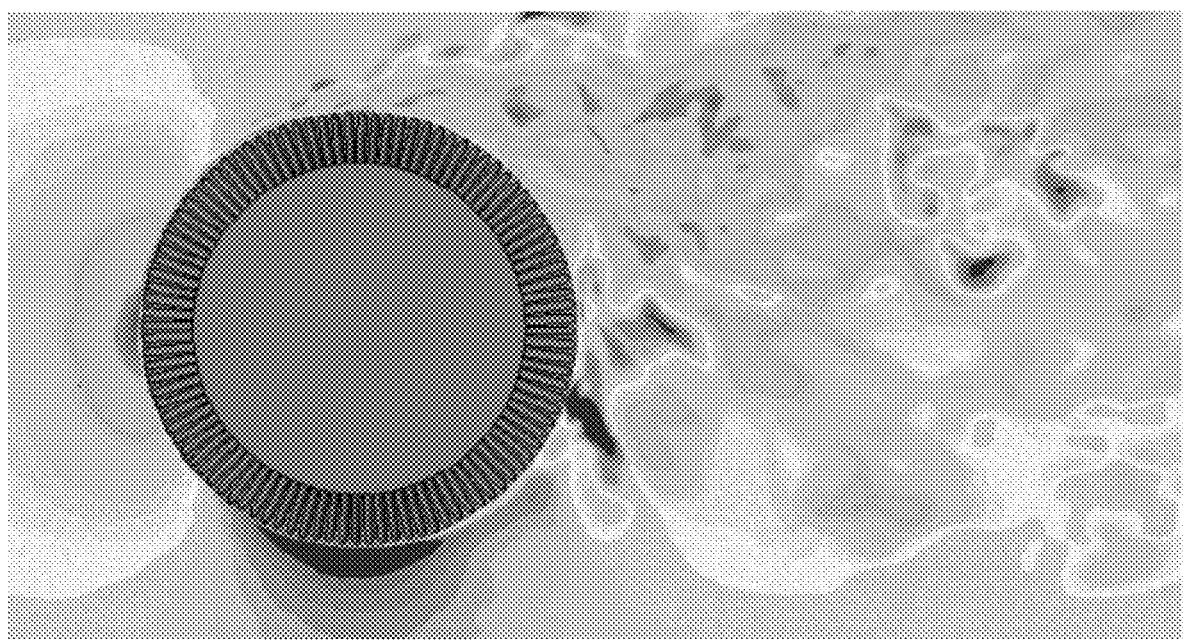
FIG. 6 Drawing showing spatial distribution of a physical quantity pertaining to a fluid at a given (instant in) time.

FIG. 6 is a drawing showing the spatial distribution of a physical quantity pertaining to a fluid at a given (instant in) time. These are the results of calculations for a given time by fluid calculator 12.

Figure 7:
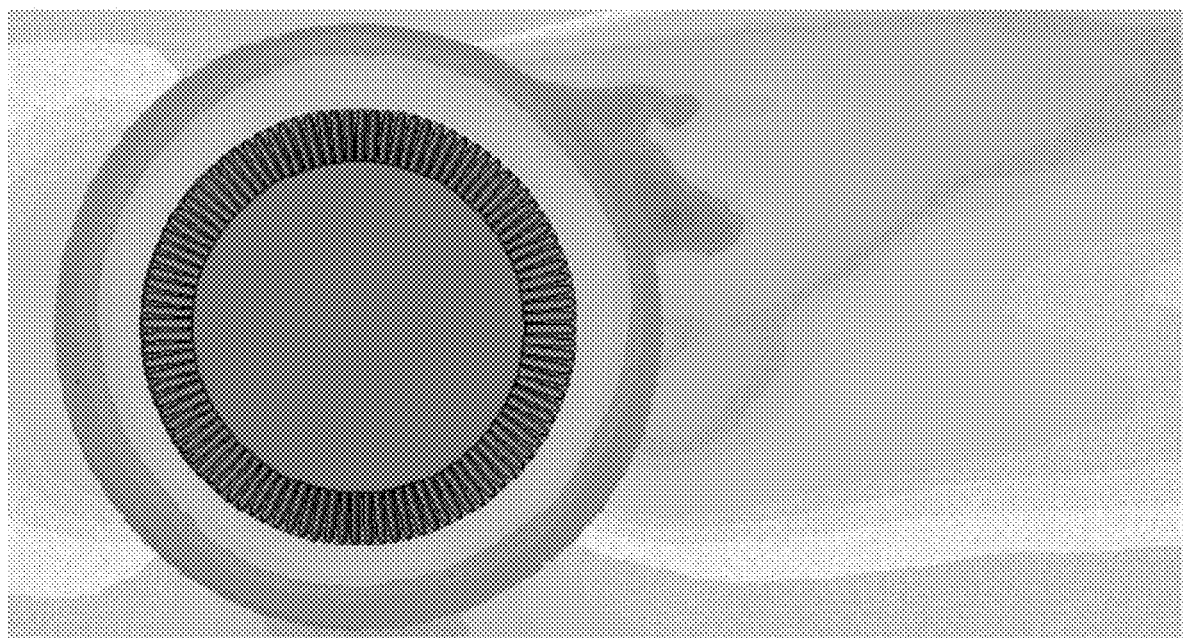
FIG. 7 Drawing of spatial distribution of average over time of physical quantity at a group of rotating computational mesh cells and at a group of stationary computational mesh cells.

FIG. 7 is a drawing showing the spatial distribution of the average over time of a physical quantity at rotating computational mesh cell group A and stationary computational mesh cell group B during a prescribed interval of time that includes a plurality of points in time. As shown in same drawing, in the region about the rotating body, because rotating computational mesh cell group A rotates and location changes, it is not possible to obtain a proper spatial distribution of the average over time.

Figure 8:
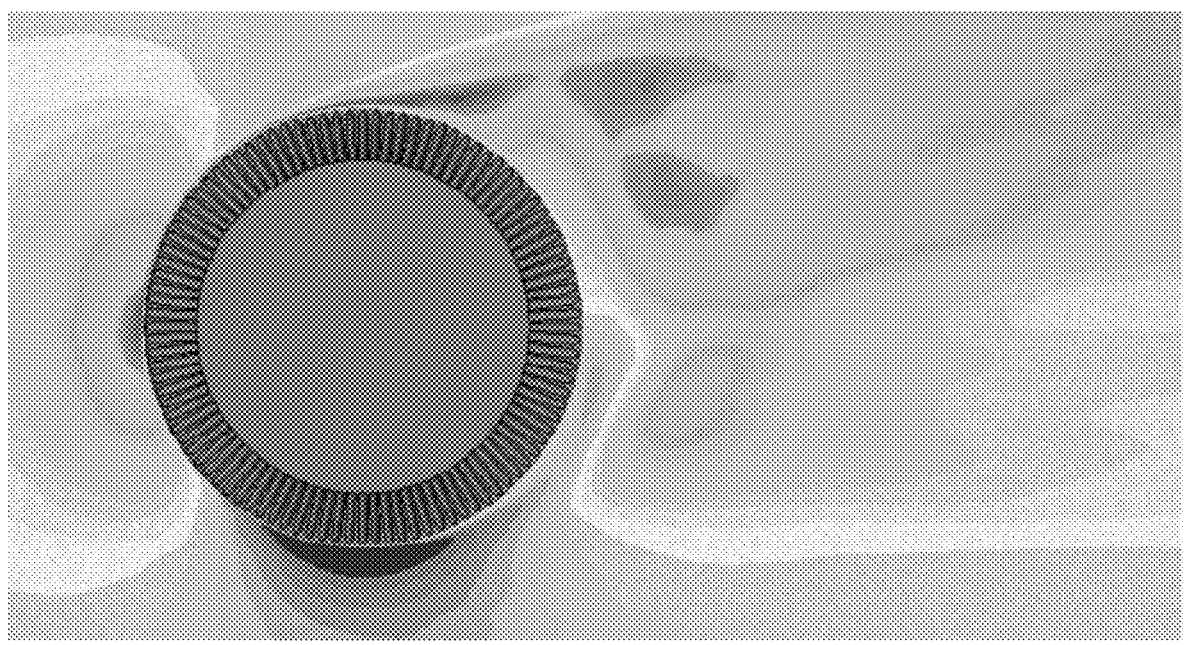
FIG. 8 Drawing of spatial distribution of average over time of physical quantity at a group of storage computational mesh cells and at a group of stationary computational mesh cells.

FIG. 8 is a drawing showing the spatial distribution of the average over time of a physical quantity at storage computational mesh cell group C and stationary computational mesh cell group B during a prescribed interval of time that includes a plurality of points in time. It is possible to obtain a proper spatial distribution of the average over time of the physical quantity.

As described above, a method for analyzing a fluid around a rotating body in accordance with the present embodiment is a method executed by a computer, and comprising: a step (S100) in which a spatial model having a rotating computational mesh cell group A which represents a space between the rotating body 2 and an imaginary boundary L that covers the rotating body 2, and a stationary computational mesh cell group B which represents a space to an exterior of the imaginary boundary L, is acquired; a step (S101) in which a storage computational mesh cell group C is established in the space between the rotating body 2 and the imaginary boundary L; a step (S102) in which arithmetic operations for fluid analysis are performed in which the arithmetic operations are carried out with respect to a physical quantity pertaining to the fluid for each computational mesh cell as a location of the stationary computational mesh cell group B is held in place and the rotating computational mesh cell group A is made to rotate about a rotational axis 2C; a step (S103) in which the physical quantity at the computational mesh cell making up the rotating computational mesh cell group A calculated as a result of the arithmetic operations for fluid analysis is copied to a corresponding computational mesh cell at the storage computational mesh cell group C; and a step (S104) in which averages over time are calculated for the physical quantities at the storage computational mesh cell group C and the stationary computational mesh cell group B.

A device for analyzing a fluid around a rotating body in accordance with the present embodiment comprising: a model acquirer 10 that acquires a spatial model having a rotating computational mesh cell group A which represents a space between the rotating body 2 and an imaginary boundary L that covers the rotating body 2, and a stationary computational mesh cell group B which represents a space to an exterior of the imaginary boundary L; a storage computational mesh cell establisher 11 that establishes a storage computational mesh cell group C in the space between the rotating body 2 and the imaginary boundary L; a fluid calculator 12 that performs arithmetic operations for fluid analysis in which the arithmetic operations are carried out with respect to a physical quantity pertaining to the fluid for each computational mesh cell as a location of the stationary computational mesh cell group B is held in place and the rotating computational mesh cell group A is made to rotate about a rotational axis 2C; a physical quantity mapper 13 that causes the physical quantity at the computational mesh cell making up the rotating computational mesh cell group A calculated as a result of the arithmetic operations for fluid analysis to be copied to a corresponding computational mesh cell at the storage computational mesh cell group C; and a time average calculator 14 that calculates averages over time for the physical quantities at the storage computational mesh cell group C and the stationary computational mesh cell group B.

By so doing, it will be possible to cause the physical quantity at rotating computational mesh cell group A for a given time to be stored at storage computational mesh cell group C, and for the set of physical quantities as they exist in space to be retained, as a result of which it will be possible to calculate the set of averages over time as they exist in space and to know the spatial distribution of the physical quantity.

In accordance with the present embodiment, the computational mesh cell making up the storage computational mesh cell group C is larger than the computational mesh cell making up the rotating computational mesh cell group A.

By so doing, so long as it is possible to know the spatial distribution of the average over time of the physical quantity, because there will be no need for the cells to be finely divided such as is the case with the computational mesh cells in the rotating computational mesh cell group, it will be possible to achieve reduction in computational cost.

In accordance with the present embodiment, the calculation of the averages over time of the physical quantities at the storage computational mesh cell group C and the stationary computational mesh cell group B is performed upon passage of each unit time.

By so doing, because time average arithmetic operations are carried out with passage of each unit time, it will be possible to reduce the storage capacity that is required.

In accordance with the present embodiment, the rotating body 2 is a tire having a groove that intersects a tire circumferential direction.

By so doing, it will be possible to obtain the spatial distribution of the average over time of a physical quantity pertaining to a fluid around a tire.

A device for analyzing a fluid around a rotating body in accordance with the present embodiment has a processor 15 and a memory 16 for storing instructions capable of being executed by the processor 15. The processor 15 is constituted in such fashion as to cause a spatial model having a rotating computational mesh cell group A which represents a space between the rotating body 2 and an imaginary boundary L that covers the rotating body 2, and a stationary computational mesh cell group B which represents a space to an exterior of the imaginary boundary L, to be acquired;

a storage computational mesh cell group C to be established in the space between the rotating body 2 and the imaginary boundary L;

arithmetic operations for fluid analysis to be performed in which the arithmetic operations are carried out with respect to a physical quantity pertaining to the fluid for each computational mesh cell as a location of the stationary computational mesh cell group B is held in place and the rotating computational mesh cell group A is made to rotate about a rotational axis 2C;

the physical quantity at the computational mesh cell making up the rotating computational mesh cell group A calculated as a result of the arithmetic operations for fluid analysis to be copied to a corresponding computational mesh cell at the storage computational mesh cell group C; and averages over time for the physical quantities at the storage computational mesh cell group C and the stationary computational mesh cell group B to be calculated.

Processor 15 may be implemented by one or more application specific integrated circuits(s) (ASIC), digital signal processor(s) (DSP), digital signal processing device(s) (DSPD), programmable logic device(s) (PLD), field programmable gate array(s) (FPGA), controller(s), microcontroller(s), microprocessor(s), and/or or other such electronic component(s).

Program(s) associated with the present embodiment are program(s) for causing the foregoing method(s) to be executed by computer(s).

The operation and effects provided by the foregoing method(s) can also be obtained as a result of execution of such program(s).

While embodiments in accordance with the present disclosure have been described above with reference to the drawings, it should be understood that the specific constitution thereof is not limited to these embodiments. The scope of the present disclosure is as indicated by the claims and not merely as described at the foregoing embodiments, and moreover includes all variations within the scope of or equivalent in meaning to that which is recited in the claims.

Structure employed at any of the foregoing embodiment(s) may be employed as desired at any other embodiment(s). The specific constitution of the various components is not limited only to the foregoing embodiment(s) but admits of any number of variations without departing from the gist of the present disclosure.

EXPLANATION OF REFERENCE NUMERALS

A Rotating computational mesh cell group
B Stationary computational mesh cell group
C Storage computational mesh cell group
10 Model acquirer
11 Storage computational mesh cell establisher
12 Fluid calculator
13 Physical quantity mapper
14 Time average calculator
15 Processor
16 Memory

The invention claimed is:

1. A method for simulating behavior of a fluid around a rotating body, comprising:
   a step in which a spatial model having a rotating computational mesh cell group which represents a space between the rotating body and an imaginary boundary that covers the rotating body, and a stationary computational mesh cell group which represents a space to an exterior of the imaginary boundary, is acquired;
   a step in which a storage computational mesh cell group is established in the space between the rotating body and the imaginary boundary;
   a step in which the simulating behavior of the fluid around the rotating body includes fluid analysis performed in such a manner that the rotating computational mesh cell group is made to rotate about a rotational axis while a location of the stationary computational mesh cell group is held in place, and that a physical quantity pertaining to the fluid for each computational mesh cell is thus obtained and;
   a step in which the physical quantity at the computational mesh cell making up the rotating computational mesh cell group calculated as a result of the fluid analysis is copied to a corresponding computational mesh cell at the storage computational mesh cell group;
   a step in which averages over time are calculated for the physical quantities at the storage computational mesh cell group and the stationary computational mesh cell group;
   a step in which, if it is determined that analysis end time has been reached, the calculated averages over time for the physical quantities at the storage computational mesh cell group and the stationary computational mesh cell group are produced as final results for the simulating behavior of the fluid around the rotating body; and
   a step in which, if it is determined that analysis end time has not been reached, unit time is made to pass from present time so as to jump to next time, the rotating computational mesh cell group is made to rotate so as to assume configuration of the spatial model for the next time, and the step in which the fluid analysis is performed iteratively.

2. The method according to claim 1 wherein the computational mesh cell making up the storage computational mesh cell group is larger than the computational mesh cell making up the rotating computational mesh cell group.

3. The method according to claim 1 wherein the calculation of the averages over time of the physical quantities at the storage computational mesh cell group and the stationary computational mesh cell group is performed upon passage of each unit time.

4. The method according to claim 1 wherein the rotating body is a tire having a groove that intersects a tire circumferential direction.

5. A device for simulating behavior of a fluid around a rotating body, comprising a processor that comprises:
   a model acquirer that acquires a spatial model having a rotating computational mesh cell group which represents a space between the rotating body and an imaginary boundary that covers the rotating body, and a stationary computational mesh cell group which represents a space to an exterior of the imaginary boundary;
a storage computational mesh cell establisher that establishes a storage computational mesh cell group in the space between the rotating body and the imaginary boundary;
a fluid calculator that performs the simulating behavior of the fluid around the rotating body including performing fluid analysis in such a manner that the rotating computational mesh cell group is made to rotate about a rotational axis while a location of the stationary computational mesh cell group is held in place, and that a physical quantity pertaining to the fluid for each computational mesh cell is thus obtained;
a physical quantity mapper that causes the physical quantity at the computational mesh cell making up the rotating computational mesh cell group calculated as a result of the arithmetic operations for fluid analysis to be copied to a corresponding computational mesh cell at the storage computational mesh cell group; and
a time average calculator that calculates averages overtime for the physical quantities at the storage computational mesh cell group and the stationary computational mesh cell group,
wherein, if the processor determines that analysis end time has been reached, the time average calculator produces the calculated averages over time for the physical quantities at the storage computational mesh cell group and the stationary computational mesh cell group as final results for the simulating behavior of the fluid around the rotating body, and
wherein, if the processor determines that analysis end time has not been reached, the processor makes unit time to pass from present time so as to jump to next time, makes the rotating computational mesh cell group to rotate so as to assume configuration of the spatial model for the next time, and causes the fluid calculator to perform the fluid analysis iteratively.

6. The device according to claim 5 wherein the computational mesh cell making up the storage computational mesh cell group is larger than the computational mesh cell making up the rotating computational mesh cell group.

7. The device according to claim 5 wherein the calculation of the averages over time of the physical quantities at the storage computational mesh cell group and the stationary computational mesh cell group is performed upon passage of each unit time.

8. The device according to claim 5 wherein the rotating body is a tire having a groove that intersects a tire circumferential direction.

9. A device for simulating behavior of a fluid around a rotating body, comprising:

a processor; and
a memory for storing instructions capable of being executed by the processor, wherein the processor is constituted in such fashion as to cause:
a spatial model having a rotating computational mesh cell group which represents a space between the rotating body and an imaginary boundary that covers the rotating body, and a stationary computational mesh cell group which represents a space to an exterior of the imaginary boundary, to be acquired;
a storage computational mesh cell group to be established in the space between the rotating body and the imaginary boundary;
simulating behavior of the fluid around the rotating body includes fluid analysis to be performed in such a manner that the rotating computational mesh cell group is made to rotate about a rotational axis while a location of the stationary computational mesh cell group is held in place, and that a physical quantity pertaining to the fluid for each computational mesh cell is thus obtained;
the physical quantity at the computational mesh cell making up the rotating computational mesh cell group calculated as a result of the fluid analysis to be copied to a corresponding computational mesh cell at the storage computational mesh cell group;
averages overtime for the physical quantities at the storage computational mesh cell group and the stationary computational mesh cell group to be calculated;
produces the calculated averages over time for the physical quantities at the storage computational mesh cell group and the stationary computational mesh cell group as final results for the simulating behavior of the fluid around the rotating body if it is determined that analysis end time has been reached; and
makes unit time to pass from present time so as to jump to next time, makes the rotating computational mesh cell group to rotate so as to assume configuration of the spatial model for the next time, and performs the fluid analysis iteratively if it is determined that analysis end time has not been reached.

10. The device according to claim 9 wherein the computational mesh cell making up the storage computational mesh cell group is larger than the computational mesh cell making up the rotating computational mesh cell group.

11. The device according to claim 9 wherein the calculation of the averages over time of the physical quantities at the storage computational mesh cell group and the stationary computational mesh cell group is performed upon passage of each unit time.

12. The device according to claim 9 wherein the rotating body is a tire having a groove that intersects a tire circumferential direction.

* * * * *